United States Patent
Qiu et al.

(10) Patent No.: US 12,265,978 B2
(45) Date of Patent: Apr. 1, 2025

(54) CUSTOMIZED PRODUCT PERFORMANCE PREDICTION METHOD BASED ON HETEROGENEOUS DATA DIFFERENCE COMPENSATION FUSION

(71) Applicant: ZHEJIANG UNIVERSITY, Hangzhou (CN)

(72) Inventors: Lemiao Qiu, Hangzhou (CN); Yang Wang, Hangzhou (CN); Shuyou Zhang, Hangzhou (CN); Zili Wang, Hangzhou (CN); Huifang Zhou, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 813 days.

(21) Appl. No.: 17/522,921

(22) Filed: Nov. 10, 2021

(65) Prior Publication Data

US 2022/0122103 A1  Apr. 21, 2022

Related U.S. Application Data

(63) Continuation of application No. PCT/CN2021/070983, filed on Jan. 8, 2021.

(30) Foreign Application Priority Data

Oct. 20, 2020  (CN) .......................... 202011124136.5

(51) Int. Cl.
G06N 3/04    (2023.01)
G06N 3/08    (2023.01)
G06Q 30/0202  (2023.01)

(52) U.S. Cl.
CPC .......... *G06Q 30/0202* (2013.01); *G06N 3/04* (2013.01); *G06N 3/08* (2013.01)

(58) Field of Classification Search
CPC ............ G06N 3/04; G06N 3/08; G06N 3/084
See application file for complete search history.

(56) References Cited

U.S. PATENT DOCUMENTS

| | | | |
|---|---|---|---|
| 2010/0023307 A1 | 1/2010 | Lee et al. | |
| 2020/0050982 A1 | 2/2020 | Newman et al. | |

FOREIGN PATENT DOCUMENTS

| | | | |
|---|---|---|---|
| CN | 104504292 A | 4/2015 | |
| CN | 104636800 A | 5/2015 | |

(Continued)

OTHER PUBLICATIONS

Xu et al ("BP neural network-based ABEP performance prediction for mobile Internet of Things communication systems" 2019) (Year: 2019).*

(Continued)

*Primary Examiner* — Lut Wong
(74) *Attorney, Agent, or Firm* — W&G Law Group

(57) ABSTRACT

Disclosed is a customized product performance prediction method based on heterogeneous data difference compensation fusion. The method includes: on the basis of a depth auto-encoder, a neighborhood association method and a similarity difference compensation method, performing difference compensation correction on a calculation simulation data set by using a historical actual measurement data set; and training a BP neural network model by using the calculation simulation data set after the difference compensation correction to serve as a performance prediction method of a customized product. According to the method of the present application, by combining the depth auto-encoder, and by utilizing the neighborhood association method and the similarity difference compensation method, low-fidelity calculation simulation data is associated with high-fidelity historical actual measurement data, such that the difference compensation correction of the low-fidelity cal- (Continued)

culation simulation data is realized by using the high-fidelity historical actual measurement data.

4 Claims, 2 Drawing Sheets

(56) References Cited

FOREIGN PATENT DOCUMENTS

| CN | 104951836 A | 9/2015 |
|---|---|---|
| CN | 105426889 A | 3/2016 |
| CN | 105893669 A | 8/2016 |
| CN | 108153982 A | 6/2018 |
| CN | 109145434 A | 1/2019 |
| CN | 110322933 A | 10/2019 |
| CN | 110634082 A | 12/2019 |
| CN | 111079891 A | 4/2020 |
| CN | 111445010 A | 7/2020 |
| CN | 111612029 A | 9/2020 |
| KR | 20190117849 A | 10/2019 |

OTHER PUBLICATIONS

Wang et al ("A generative neural network model for the quality prediction of work in progress products" 2019) (Year: 2019).*
International Search Report (PCT/CN2021/070983); Date of Mailing: Jul. 21, 2021.
Chinese Notice Of Allowance (202011124136.5); Date of Mailing: Mar. 23, 2022 (6 pages).
Method for designing parts structure to resist harsh environments considering sobol defects sensitivity.
Spring-Back Preditcion of the Bi-Layered Metallic Tube under CNC Bending Considering Neutral Layer Shifting Extraction.

* cited by examiner

CUSTOMIZED PRODUCT PERFORMANCE PREDICTION METHOD BASED ON HETEROGENEOUS DATA DIFFERENCE COMPENSATION FUSION

CROSS-REFERENCE TO RELATED APPLICATIONS

The present application is a continuation of International Application No. PCT/CN2021/070983, filed on Jan. 8, 2021, which claims priority to Chinese Application No. 202011124136.5, filed on Oct. 20, 2020, the contents of both of which are incorporated herein by reference in their entireties.

TECHNICAL FIELD

The present application belongs to the field of customized product performance prediction in an "Internet+" environment, and in particular relates to a customized product performance prediction method based on heterogeneous data difference compensation fusion.

BACKGROUND

In an "Internet+" environment, the personalized requirements of users on products are increasingly prominent, and meanwhile, higher requirements are also put forward in terms of in-depth participation of the users in the design process. For the design of personalized customized products driven by user requirements, the performance prediction of the customized products is helpful for realizing efficient and quick response to the user requirements in the design stage, meanwhile, the design cost can be effectively reduced, and the design period is shortened, so that the users can be effectively promoted to deeply participate in the design process.

There are generally two traditional product performance prediction methods. The first method is to perform deduction and prediction based on historical actual measurement performance, so as to realize the deduction and prediction of "performance-performance" from the perspective of accumulated historical actual measurement performance data, the credibility is relatively high, however, the cost is high, the cycle is long, and the response is slow. The second method is to perform simulation and prediction on the basis of structural shape modeling, so as to realize the simulation and prediction of "shape-performance" from the perspective of structural shape modeling and calculation simulation, the response is efficient and fast, but the calculation simulation has a relatively large error, such that the reliability of performance prediction is low. The above two methods are difficult to achieve efficient, rapid and credible prediction of the customized products in the design stage.

SUMMARY

The object of the present application is to provide a customized product performance prediction method based on heterogeneous data difference compensation fusion in view of the deficiencies in the prior art. The present application uses a BP neural network model as a prediction model, and performs heterogeneous data difference compensation fusion by means of a neighborhood association method and a similarity difference compensation method, in combination with a depth auto-encoder, and performs association and difference compensation correction on low-fidelity calculation simulation performance data by using high-fidelity historical actual measurement performance data, such that variable fidelity prediction of product performance can be realized, thereby solving the problem that it is difficult to efficiently and credibly predict the performance of a customized product in a design stage.

The object of the present application is realized by the following technical solutions: a customized product performance prediction method based on heterogeneous data difference compensation fusion, including the following steps:

(1) with a configuration parameter of a customized product as an input feature and performance of the customized product to be predicted as an output feature, collecting and obtaining data samples; collecting actual measurement performance data of an existing product, and constructing a historical actual measurement data set for performance prediction of the customized product; establishing a virtual simulation model of the customized product by using computer simulation software, obtaining performance data through simulation analysis, and constructing a calculation simulation data set for performance prediction of the customized product;

(2) performing data preprocessing on the historical actual measurement data set and the calculation simulation data set;

(3) performing difference compensation correction on the calculation simulation data set on the basis of the historical actual measurement data set: encoding the historical actual measurement data set and the calculation simulation data set on the basis of a depth auto-encoder, mapping the data samples from an input space into a feature space, so as to express key features of the data samples, denoting the encoded historical actual measurement data set as $ESet_h$, and denoting the encoded calculation simulation data set as $ESet_s$; dividing the data set $ESet_h$ into a training sample set, a verification sample set and a test sample set through random sampling, and respectively denoting them as a historical actual measurement training set $ESet_{htrain}$, a historical actual measurement verification set $ESet_{hvalid}$, and a historical actual measurement test set $ESet_{htest}$; and finally, performing associated connection on the data set $ESet_s$ and the data set $ESet_{htrain}$ by using a neighborhood association method, performing difference compensation correction on the data set $ESet_s$ by using the data set $ESet_{htrain}$ by means of a similarity difference compensation method, and denoting the data set $ESet_s$ after the difference compensation correction as $MSet_s$;

(4) selecting a BP neural network model as a performance prediction model of the customized product, and taking the input feature and the output feature selected in the step (1) as the input and output of the prediction model; using the calculation simulation data set after the difference compensation correction as the training sample set, and training and constructing an optimal BP neural network model combined with a tabu search algorithm; and then testing the model by using the historical actual measurement test set $ESet_{htest}$, so as to obtain a final performance prediction model of the customized product; and (5) for a data sample to be predicted, firstly performing data preprocessing according to the processing of the calculation simulation data set in the step (2), and then inputting the data sample into the depth auto-encoder constructed in the step (3) for encoding, and finally inputting the encoded sample to be predicted into the prediction model constructed in the step (4) for prediction, and obtaining the product performance of the customized product under different configuration parameter conditions.

Further, the step (2) includes: firstly performing data denoising and data supplement processing on the historical actual measurement data set; and then performing data normalization processing on the historical actual measurement data set and the calculation simulation data set respectively.

Further, in the step (3), a neural network model is trained by using the historical actual measurement data set and the calculation simulation data set to serve as the depth auto-encoder for the data samples. The depth auto-encoder is composed of an input layer, an encoder, a feature expression layer, a decoder and an output layer, and both the encoder and the decoder include three hidden layers. The input and output of the depth auto-encoder are input feature vectors of the data samples, and the layers are fully connected, an activation function between the input layer and the hidden layer, and the activation function between the hidden layer and the hidden layer are the relu function, and the activation function between the hidden layer and the output layer is the tanh function.

Further, in the step (3) associated connection on the encoded calculation simulation data set $ESet_s$ and the encoded historical actual measurement training set $ESet_{htrain}$ is performed by using the neighborhood association method, the specific association process is: initializing an empty mark set for each data sample in the data set $ESet_s$; randomly selecting a data sample $Sample_k$ in the data set $ESet_{htrain}$, taking the data sample $Sample_k$ as the center, taking a neighborhood threshold ε as the radius, adding tags of data samples in the data set $ESet_s$ within this neighborhood range into the mark set, wherein the added mark is the serial number of the data sample $Sample_k$, and at the same time, setting the access attribute of the data sample $Sample_k$ as visited; traversing all data samples whose access attributes are unvisited in the data set $ESet_{htrain}$, and repeatedly adding marks for the data samples within the neighborhood range, until the access attributes of all the data samples in the data set $ESet_{htrain}$ are visited.

Further, in the step (3) difference compensation correction on the encoded calculation simulation data set $ESet_s$ is performed by using the historical actual measurement training set $ESet_{htrain}$ on the basis of the similarity difference compensation method, the similarity difference compensation method is: traversing the data set $ESet_s$, and performing difference compensation correction on the output feature of the data sample for each data sample $Sample_l$ whose mark tag is not empty according to the following formula:

$$\hat{y}^l_{FEA} = y^l_{FEA} + \frac{\sum_{z=1}^{M} e^{-\alpha S_z} \cdot \Delta y_z + \beta}{\sum_{z=1}^{M} e^{-\alpha S_z}}$$

$$\Delta y_z = |y^z_{real} - y^l_{FEA}|$$

wherein, $\hat{y}^l_{FEA}$ represents an output feature vector of the data sample $Sample_l$ after the difference compensation correction; $y^l_{FEA}$ represents the output feature vector of the data sample $Sample_l$ before the difference compensation correction, that is, the output feature vector obtained through simulation analysis; M represents the number of marks in the mark set of the data sample $Sample_l$, that is, the number of data samples in the data set $ESet_{htrain}$ associated with the data sample $Sample_l$; $S_z$ represents the Euclidean distance between the data sample $Sample_l$ and the data sample in the $z^{th}$ data set $ESet_{htrain}$ associated with the data sample $Sample_l$, and the value measures the similarity between the two data samples; $\Delta y_z$ represents an absolute difference between the output feature vector of the data sample $Sample_l$ and the output feature vector of the data sample in the $z^{th}$ data set $ESet_{htrain}$ associated with the data sample $Sample_l$; $y^z_{real}$ represents the output feature vector of the data sample in the $z^{th}$ data set $ESet_{htrain}$ associated with the data sample $Sample_l$; and α and β are hyperparameters.

Further, in the step (4), the calculation simulation data set $ESet_s$ after the difference compensation correction is taken as the training sample set, the historical actual measurement verification set $ESet_{hvalid}$ is taken as the verification sample set, the historical actual measurement test set $ESet_{htest}$ is taken as the test sample set, and an optimal BP neural network model $BPNN_{sopt}$ is trained and constructed in combination with the tabu search algorithm to serve as the final prediction model. The model is composed of an input layer, three hidden layers and an output layer, the layers are fully connected, the number of neurons in the input layer is the number of input features of the data sample, the number of neurons in the output layer is the number of output features of the data sample, the number of neurons in the hidden layers is respectively $h_1$, $h_2$ and $h_3$, and the ranges of $h_1$, $h_2$ and $h_3$ are determined by means of $L=\sqrt{n_{in}+n_{out}}+a$, wherein L represents the number of neurons in the hidden layer, $n_{in}$ represents the number of neurons in the input layer, $n_{out}$ represents the number of neurons in the output layer, and a is a constant between (1,10); different $h_1$, $h_2$ and $h_3$ are selected in the corresponding ranges, the model under the current combination of $h_1$, $h_2$ and $h_3$ is trained by using the training sample set, and the model obtained by training is verified by using the verification sample set, so as to obtain a verification error under the current combination of $h_1$, $h_2$ and $h_3$; with the verification error as the target, $h_1$, $h_2$ and $h_3$ are optimized by using the tabu search algorithm, and the optimal numbers $h_{1opt}$, $h_{2opt}$ and $h_{3opt}$ of neurons in the hidden layers are determined, therefore training is performed on the basis of the current fixed number of hidden layers, so as to obtain an optimal model $BPNN_{sopt}$; and the optimal model $BPNN_{sopt}$ is tested by using the test sample set, if requirements are met, the model is selected as the final prediction model, or otherwise, the number of hidden layers of the BP neural network model is reset, and a new network model is retrained.

Further, in the step (4), the initialization of the hidden layer adopts the following method: weights are all initialized as random numbers between [−1,1] that obey normal distribution, and deviations are all initialized to 0; and the activation function adopts the form of relu-relu-relu-tanh, the loss function adopts a mean square loss function, and the weights and the deviations are updated by using a small batch gradient descent method.

The beneficial effects of the present application are: the method of the present application includes the steps of encoding the input feature of the data samples by using the depth auto-encoder, mapping the data samples from the input space into the feature space, so as to express key features of the data samples, and the association and similarity between a simulation data sample and a historical actual measurement data sample can be expressed; on the basis of the encoding of the data samples, and by adopting the neighborhood association method and the similarity difference compensation method, the associated connection between historical actual measurement data and calculation simulation data is realized, and meanwhile, the difference compensation correction of low-fidelity calculation simulation data is realized by using high-fidelity historical actual measurement data, such that the difference compensation fusion between the calculation simulation data and the historical actual measurement data can be effectively realized. The method of the present application can realize the variable fidelity prediction of the performance of the customized product through the heterogeneous data difference compensation fusion, thus improving the generalization ability of the performance prediction model, and effectively realizing the efficient and reliable prediction of the performance of the customized product in the design stage.

DESCRIPTION OF EMBODIMENTS

The present application will be further described in detail below in conjunction with the drawings and specific embodiments.

Figure 1:
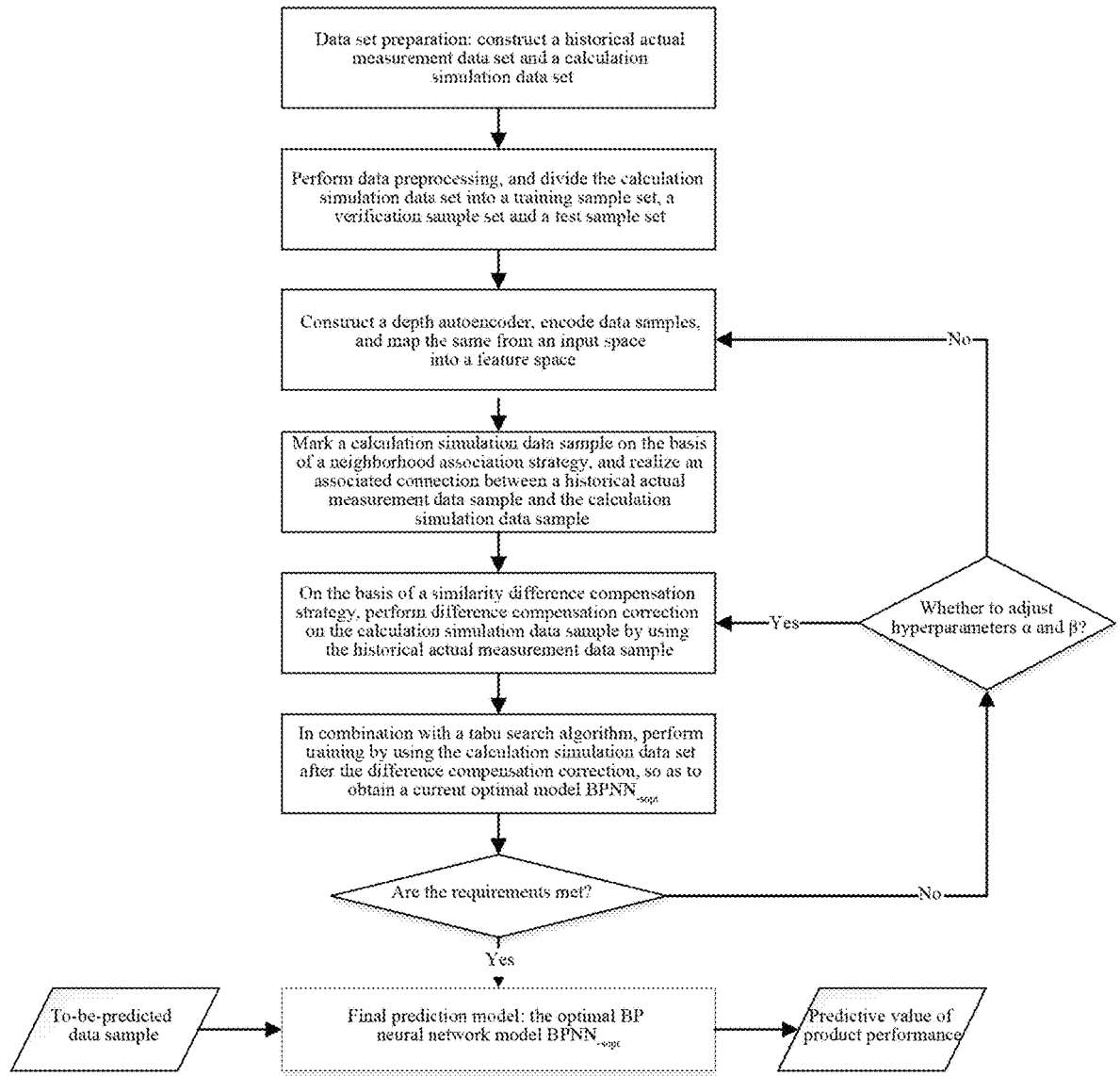
FIG. 1 is a flow diagram of a customized product performance prediction method according to the present application.

The present application takes the performance prediction of a peak-to-peak value of the horizontal vibration acceleration of an elevator car of a customized elevator product as an embodiment, and trains and constructs a BP neural network model to establish a mapping relationship between configuration parameters of the customized elevator product and the peak-to-peak value of the horizontal vibration acceleration of the elevator car, so as to perform reliable prediction on the horizontal vibration performance of the elevator car of the elevator product under different configuration parameters. FIG. 1 is a flow diagram of the prediction method constructed according to the embodiment of the present application, as shown in FIG. 1:

A customized product performance prediction method based on heterogeneous data difference compensation fusion of the present application includes the following steps:

step 1: with a configuration parameter of a customized product as an input feature and performance to be predicted of the customized product as an output feature, collecting and obtaining data samples; collecting actual measurement performance data of an existing product, and constructing a historical actual measurement data set for performance prediction of the customized product; establishing a virtual simulation model of the customized product by using computer simulation software, obtaining performance data through simulation analysis, and constructing a calculation simulation data set for performance prediction of the customized product.

In the embodiment of the present application, the maximum operating speed $v_{max}$, the maximum operating acceleration $a_{max}$, the operating height H, the density $\rho$ of a hoist rope, the nominal diameter D of hoist rope, the elastic modulus E of the hoist rope, the mass $m_{frame}$ of a car frame, the equivalent rotational inertia $J_{frame}$ of the car frame, the mass $m_{car}$ of the elevator car, the equivalent inertia $J_{car}$ of the elevator car, the rated load $m_{load}$, the equivalent stiffness $k_{shoe}$ and damping $c_{shoe}$ of a guide shoe spring, and the equivalent stiffness $k_{rub}$ and damping $c_{rub}$ of damping rubber of the customized elevator product are taken as the input features, and the peak-to-peak value $a_{hvpp}$ of the horizontal vibration acceleration of the elevator car of the customized elevator product is taken as the output feature, so as to collect and obtain training data samples.

Measured peak-to-peak values of the horizontal vibration acceleration of the elevator cars of existing elevator products are collected from enterprises, so as to construct the historical actual measurement data set; and an experimental design is performed on the basis of the Latin hypercube sampling method, then the virtual simulation model of the elevator product is established by using the computer simulation software ADAMS and the product development software NX, the peak-to-peak value of the horizontal vibration acceleration of the elevator car is obtained by means of Ansys simulation analysis, so as to construct the calculation simulation data set.

Step 2: performing data preprocessing on the historical actual measurement data set and the calculation simulation data set, including data denoising, data supplement and data normalization processing. First, to deal with the problems of noise, feature value missing and the like in the actual measurement data samples, the data denoising and data supplement processing is performed on the historical actual measurement data set; and then, the data normalization processing is performed on the historical actual measurement data set and the calculation simulation data set, respectively. The historical actual measurement data set and the calculation simulation data set before the data normalization processing are shown in Table 1 and Table 2, respectively.

TABLE 1

Historical actual measurement data of the peak-to-peak value of the horizontal vibration acceleration of the elevator car

| | | Serial number | | | | | | | | | |
|---|---|---|---|---|---|---|---|---|---|---|---|
| Input/output | | 1 | 2 | 3 | 4 | 5 | 6 | ... | 20 | ... | 40 |
| Input feature | $v_{max}$[m/s] | 5 | 6 | 7 | 8 | 9 | 10 | ... | 7 | ... | 10 |
| | $a_{max}$[m²/s] | 0.8 | 1 | 1 | 1.1 | 1.2 | 1.2 | ... | 0.9 | ... | 1 |
| | H[m] | 100 | 150 | 175 | 200 | 200 | 300 | ... | 150 | ... | 250 |
| | $\rho$[kg/m] | 0.52 | 0.6 | 0.58 | 0.62 | 0.52 | 0.54 | ... | 0.56 | ... | 0.60 |
| | E[N/m²] | 8e10 | 6e10 | 8e10 | 7e10 | 8e10 | 9e10 | ... | 8e10 | ... | 9e10 |
| | D[mm] | 12 | 14 | 13 | 14 | 16 | 16 | ... | 14 | ... | 16 |
| | $m_{car}$[kg] | 1000 | 1050 | 1050 | 1100 | 1250 | 1250 | ... | 1000 | ... | 950 |

TABLE 1-continued

Historical actual measurement data of the peak-to-peak value of the horizontal vibration acceleration of the elevator car

| Input/output | | Serial number | | | | | | | | | |
|---|---|---|---|---|---|---|---|---|---|---|---|
| | | 1 | 2 | 3 | 4 | 5 | 6 | ... | 20 | ... | 40 |
| | $J_{car}[kg \cdot m^2]$ | 5834 | 6982 | 7621 | 7854 | 8045 | 8090 | ... | 5026 | ... | 4039 |
| | $m_{frame}[kg]$ | 975 | 1000 | 1025 | 1075 | 1150 | 1075 | ... | 925 | ... | 900 |
| | $J_{frame}[kg \cdot m^2]$ | 3654 | 4568 | 5246 | 5321 | 5964 | 5724 | ... | 2861 | ... | 2080 |
| | $m_{load}[kg]$ | 1000 | 1000 | 1000 | 1000 | 1200 | 1600 | ... | 1000 | ... | 1400 |
| | $k_{shoe}[N/m]$ | 4e5 | 3e5 | 6e5 | 5e5 | 7e5 | 9e5 | ... | 5e5 | ... | 1e6 |
| | $c_{shoe}[N \cdot s/m]$ | 800 | 600 | 700 | 500 | 650 | 500 | ... | 900 | ... | 400 |
| | $k_{rub}[N/m]$ | 4e5 | 3e5 | 6e5 | 5e5 | 7e5 | 9e5 | ... | 5e5 | ... | 1e6 |
| | $c_{rub}[N \cdot s/m]$ | 800 | 600 | 700 | 500 | 650 | 500 | ... | 900 | ... | 400 |
| Output feature | $a_{hvpp}[m^2/s]$ | 0.9975 | 1.0831 | 0.8365 | 0.8452 | 0.5764 | 0.6613 | ... | 1.1396 | ... | 1.3937 |

TABLE 2

Calculation simulation data of the peak-to-peak value of the horizontal vibration acceleration of the elevator car

| Input/output | | Serial number | | | | | | | | | |
|---|---|---|---|---|---|---|---|---|---|---|---|
| | | 1 | 2 | 3 | 4 | 5 | 6 | ... | 50 | ... | 100 |
| Input feature | $v_{max}[m/s]$ | 5.16 | 5.77 | 6.4 | 8.28 | 5.6 | 6.74 | ... | 7.86 | ... | 8.7 |
| | $a_{max}[m^2/s]$ | 0.9 | 0.91 | 1.17 | 1.11 | 0.96 | 0.94 | ... | 0.87 | ... | 0.99 |
| | $H[m]$ | 174.7 | 183.9 | 270.6 | 329.4 | 392.4 | 215.5 | ... | 201.4 | ... | 351.3 |
| | $\rho[kg/m]$ | 0.66 | 0.59 | 0.6 | 0.6 | 0.61 | 0.55 | ... | 0.67 | ... | 0.64 |
| | $E[N/m^2]$ | 11e10 | 9.7e10 | 8.4e10 | 9.8e10 | 9.9e10 | 8.1e10 | ... | 10e10 | ... | 9.1e10 |
| | $D[mm]$ | 11.5 | 16.7 | 11.7 | 10.0 | 15.7 | 13.4 | ... | 13.9 | ... | 17.7 |
| | $m_{car}[kg]$ | 1000 | 1189 | 1241 | 1152 | 1214 | 1114 | ... | 1085 | ... | 955 |
| | $J_{car}[kg \cdot m^2]$ | 6832 | 6377 | 5340 | 5156 | 4052 | 7045 | ... | 4941 | ... | 8024 |
| | $m_{frame}[kg]$ | 1055 | 924 | 1044 | 1101 | 1079 | 1075 | ... | 1111 | ... | 904 |
| | $J_{frame}[kg \cdot m^2]$ | 5154 | 5601 | 4409 | 3215 | 4835 | 2304 | ... | 5325 | ... | 4771 |
| | $m_{load}[kg]$ | 1428 | 1373 | 1074 | 1731 | 1879 | 1140 | ... | 1123 | ... | 1967 |
| | $k_{shoe}[N/m]$ | 9.2e5 | 2.6e5 | 6.8e5 | 6.0e5 | 5.0e5 | 2.9e5 | ... | 9.9e5 | ... | 9.6e5 |
| | $c_{shoe}[N \cdot s/m]$ | 1792 | 1046 | 1280 | 854 | 751 | 1914 | ... | 1576 | ... | 1382 |
| | $k_{rub}[N/m]$ | 5.6e5 | 2.3e5 | 2.0e5 | 4.0e5 | 9.6e5 | 7.6e5 | ... | 2.7e5 | ... | 4.6e5 |
| | $c_{rub}[N \cdot s/m]$ | 1615 | 2103 | 686 | 952 | 1896 | 1361 | ... | 1252 | ... | 663 |
| Output feature | $a_{hvpp}[m^2/s]$ | 0.6047 | 0.5738 | 0.4324 | 0.5784 | 1.2177 | 0.7204 | ... | 0.4393 | ... | 0.4876 |

In the embodiment of the present application, when the data denoising processing is performed on the historical actual measurement data set, an outlier detection method is utilized. By utilizing the outlier detection method based on clustering, sample points in the data set are clustered, the data sample points are organized into "clusters" through clustering, after the clustering is completed, the data samples that cannot belong to any cluster are outliers, therefore the outliers are detected while the clusters are discovered. The detected outliers are noise in the data set, and the denoising of the data set can be achieved by removing these outliers from the data set. The embodiment of the present application adopts the DBSCAN clustering method.

In the embodiment of the present application, when the data supplement processing is performed on the historical actual measurement data set, when the number of missing feature values of the data sample exceeds 5, the data sample is removed, or otherwise, an average feature value is used for supplementing the missing features of the data sample.

In the embodiment of the present application, the normalization processing is respectively performed on the input features of the historical actual measurement data set and the calculation simulation data set, so that the input feature values of the data samples are all between [−1,1], and the data normalization processing formula is as follows:

$$x'_i = \frac{2}{x_{i,max} - x_{i,min}}(x_i - x_{i,min}) - 1, i = 1, 2, \ldots, m \quad (1)$$

In formula (1), $x'_i$ represents the $i^{th}$ input feature value after normalization, $x_i$ represents the normalized $i^{th}$ input feature value, $x_{i,max}$ represents the maximum value of the normalized $i^{th}$ input feature value, $x_{i,min}$ represents the minimum value of the normalized $i^{th}$ input feature value, and m represents the number of input features of the data set.

Step 3: performing difference compensation correction on the calculation simulation data set on the basis of the historical actual measurement data set: encoding the historical actual measurement data set and the calculation simulation data set on the basis of a depth auto-encoder, mapping the data samples from an input space into a feature space, so as to express key features of the data samples, denoting the encoded historical actual measurement data set as $ESet_h$, and denoting the encoded calculation simulation data set as $ESet_s$; thereafter, performing random sampling at a ratio of the number of training samples to the number of verification samples to the number of test samples being 7:2:1, so as to divide the data set $ESet_h$ into a training sample set, a verification sample set and a test sample set, and respectively denoting them as a historical actual measurement training set $ESet_{htrain}$, a historical actual measurement verification set $ESet_{hvalid}$, and a historical actual measurement test set $ESet_{htest}$; and finally, performing associated connection on the data set $ESet_s$ and the data set $ESet_{htrain}$ by using a neighborhood association method, performing difference compensation correction on the data set $ESet_s$ by using the data set $ESet_{htrain}$ by means of a similarity difference compensation method, and denoting the data set $ESet_s$ after the difference compensation correction as $ESet_{smod}$.

In the embodiment of the present application, the specific description on the process of performing the difference compensation correction on the encoded calculation simulation data set $ESet_s$ by using the historical actual measurement training set $ESet_{htrain}$ is as follows:

Step 3.1: taking the historical actual measurement data set and the calculation simulation data set as the training sample set, so as to construct and train a depth auto-encoder, encoding the data samples, denoting the encoded calculation simulation data set as $ESet_s$, and denoting the encoded historical actual measurement data set as $ESet_h$.

Figure 2:
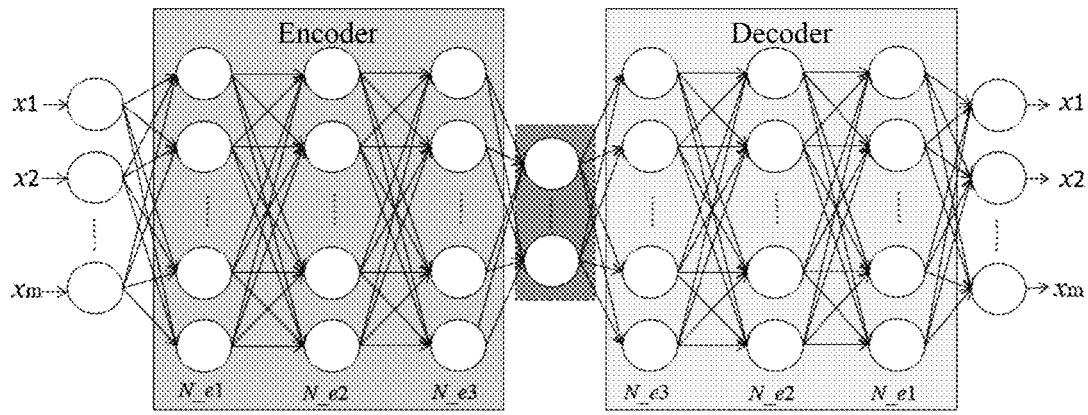
FIG. 2 is a topological structure diagram of a depth auto-encoder constructed on the basis of a calculation simulation data set and a historical actual measurement data set according to an embodiment of the present application.

The depth auto-encoder is constructed by using a BP neural network, and the topological structure of the depth auto-encoder is shown in FIG. 2. The depth auto-encoder is composed of an input layer, an encoder, a feature expression layer, a decoder and an output layer, and both the encoder and the decoder include three hidden layers, and the layers are fully connected. The input and output of the depth auto-encoder are input feature vectors of the data samples, that is, the number of neurons in the input layer and the number of neurons in the output layer are both the number of input features of the data samples, which is 15; the numbers of neurons in the three hidden layers of the encoder are respectively $N_{e1}$, $N_{e2}$ and $N_{e3}$, and correspondingly, the numbers of neurons in the three hidden layers of the decoder are respectively $N_{e3}$, $N_{e2}$ and $N_{e1}$. The ranges of $N_{e1}$, $N_{e2}$ and $N_{e3}$ can be determined by an empirical formula $L_e = \sqrt{n_{ein}+n_{eout}}+a_e$, wherein $L_e$ represents the number of neurons in the hidden layer of the encoder/decoder, $n_{ein}$ represents the number of neurons in the input layer, $n_{eout}$ represents the number of neurons in the feature expression layer, and $a_e$ is a constant between (1,10). Different combinations of $N_{e1}$, $N_{e2}$ and $N_{e3}$ are selected within the range of the number of neurons in the hidden layer determined by the empirical formula on the basis of a ten-fold cross-validation method, the depth auto-encoder is constructed and trained, a cross-validation error of the model is calculated, and the group with the minimum cross-validation error is selected as the number of neurons in the hidden layer of the encoder/decoder.

More, the initialization of each hidden layer adopts the following method: weights are all initialized as random numbers between [−1,1] that obey normal distribution, and deviations are all initialized to 0; the activation function between the input layer and the hidden layer, and between the hidden layer and the hidden layer adopt the relu function, and the activation function between the hidden layer and the output layer adopts the tanh function; the loss function adopts a mean square loss function; and the weights and the deviations are updated by using a small batch gradient descent method.

The depth auto-encoder is trained using the calculation simulation data set and the historical actual measurement data set. After the training is completed, the output of the feature expression layer is extracted as the feature vector after the data sample is encoded.

Step 3.2: dividing the encoded historical actual measurement data set $ESet_h$: performing random sampling at a ratio of the number of training samples to the number of verification samples to the number of test samples being 7:2:1, so as to divide the data set $ESet_h$ into the training sample set, the verification sample set and the test sample set, and respectively denoting them as the historical actual measurement training set $ESet_{htrain}$, the historical actual measurement verification set $ESet_{hvalid}$, and the historical actual measurement test set $ESet_{htest}$.

Step 3.3: associating the encoded calculation simulation data set $ESet_s$ with the historical actual measurement training set $ESet_{htrain}$ by using the neighborhood association method.

Definition: ε is set as a neighborhood size threshold, a data sample A is taken as the center, the neighborhood size threshold ε is taken as the radius, if a data sample B is within the neighborhood (hypersphere) of the data sample A, it is confirmed that the data sample B is associated with the data sample A, that is to say, when the Euclidean distance between the data sample B and the data sample A is less than the threshold ε, the data sample B is associated with the data sample A, otherwise the data sample B is unassociated with the data sample A.

Based on the above definition, the process of associating the data samples by using the neighborhood association method can be expressed as: initializing an empty mark set for each data sample in the data set $ESet_s$; randomly selecting a data sample $Sample_k$ in the data set $ESet_{htrain}$, taking the data sample $Sample_k$ as the center, taking the neighborhood threshold ε as the radius, adding tags of data samples in the data set $ESet_s$ within this neighborhood range (suprasphere) into the mark set, wherein the added mark is the serial number of the data sample $Sample_k$, and at the same time, setting the access attribute of the data sample $Sample_k$ as visited; traversing all data samples whose access attributes are unvisited in the data set $ESet_{htrain}$, and repeatedly the above process until the access attributes of all the data samples in the data set $ESet_{htrain}$ are visited. Therefore, for any data sample in the data sample set $ESet_s$, the number of data samples in the data set $ESet_{htrain}$ related to the data sample may be zero or multiple.

The above process is expressed by the following pseudo-codes:

Input: the data set $ESet_s$, the data set $ESet_{htrain}$, and the neighborhood threshold ε
Output: the mark set of any data sample in the data set $ESet_s$
for the data sample $Sample_s$ in the data set $ESet_s$:
   the mark set of the initial data sample $Sample_s$ is empty, that is:
   $Sample_s$.flag = { };
for the data sample $Sample_k$ in the data set $ESet_{htrain}$:
   if the access attribute of the data sample $Sample_k$ == unvisited:
     an association set $Set_{corr}$ = { };
     for the data sample $Sample_n$ in the data sample set $ESet_s$:
       distance = $||Sample_n - Sample_k||_2^2$
       if distance < the the neighborhood threshold ε:
         add the data sample $Sample_n$ into the $Set_{corr}$
         $Set_{corr}$.add($Sample_n$);
     for the data sample $Sample_t$ in the association set $Set_{corr}$:
       add the serial number k of the data sample $Sample_k$ into the mark set of the data sample $Sample_t$
       $Sample_t$.flag.add(k);

Step 3.4: performing difference compensation correction on the encoded calculation simulation data set $ESet_s$ by using the historical actual measurement training set $ESet_{htrain}$ on the basis of the similarity difference compensation method, and denoting the calculation simulation data set after the difference compensation correction as $MSet_s$.

On the basis of the encoding of the input features in the step 3.1, by calculating the Euclidean distance between the data sample in the data set $ESet_{htrain}$ and the data sample in the data set $ESet_s$, the similarity between the two can be measured. The larger the Euclidean distance is, the smaller the similarity between the two is, and on the contrary, the greater the similarity between the two is, therefore the weight of the data sample in the data set $ESet_s$ when the data sample in the data set $ESet_{htrain}$ is corrected can be measured by the similarity.

Specifically, the similarity difference compensation method can be expressed as: traversing the data set $ESet_s$, and performing difference compensation correction on the output feature of the data sample for each data sample $Sample_l$ whose mark tag is not empty according to the following formula:

$$\hat{y}^l_{FEA} = y^l_{FEA} + \frac{\sum_{z=1}^{M} e^{-\alpha S_z} \cdot \Delta y_z + \beta}{\sum_{z=1}^{M} e^{-\alpha S_z}} \quad (2)$$

$$\Delta y_z = |y^z_{real} - y^l_{FEA}| \quad (3)$$

wherein, $\hat{y}_{FEA}$ represents an output feature vector of the data sample $Sample_l$ after the difference compensation correction; $y_{FEA}^l$ represents the output feature vector of the data sample $Sample_l$ before the difference compensation correction, that is, the output feature vector obtained through simulation analysis; M represents the number of marks in the mark set of the data sample $Sample_l$, that is, the number of data samples in the data set $ESet_{htrain}$ associated with the data sample $Sample_l$; $S_z$ represents the Euclidean distance between the data sample $Sample_l$ and the data sample in the $z^{th}$ data set $ESet_{htrain}$ associated with the data sample $Sample_l$, and the value measures the similarity between the two data samples; $\Delta y_z$ represents an absolute difference between the output feature vector of the data sample $Sample_l$ and the output feature vector of the data sample in the $z^{th}$ data set $ESet_{htrain}$ associated with the data sample $Sample_l$; $y_{real}^z$ represents the output feature vector of the data sample in the $z^{th}$ data set $ESet_{htrain}$ associated with the data sample $Sample_l$; and $\alpha$ and $\beta$ are hyperparameters.

Figure 3:
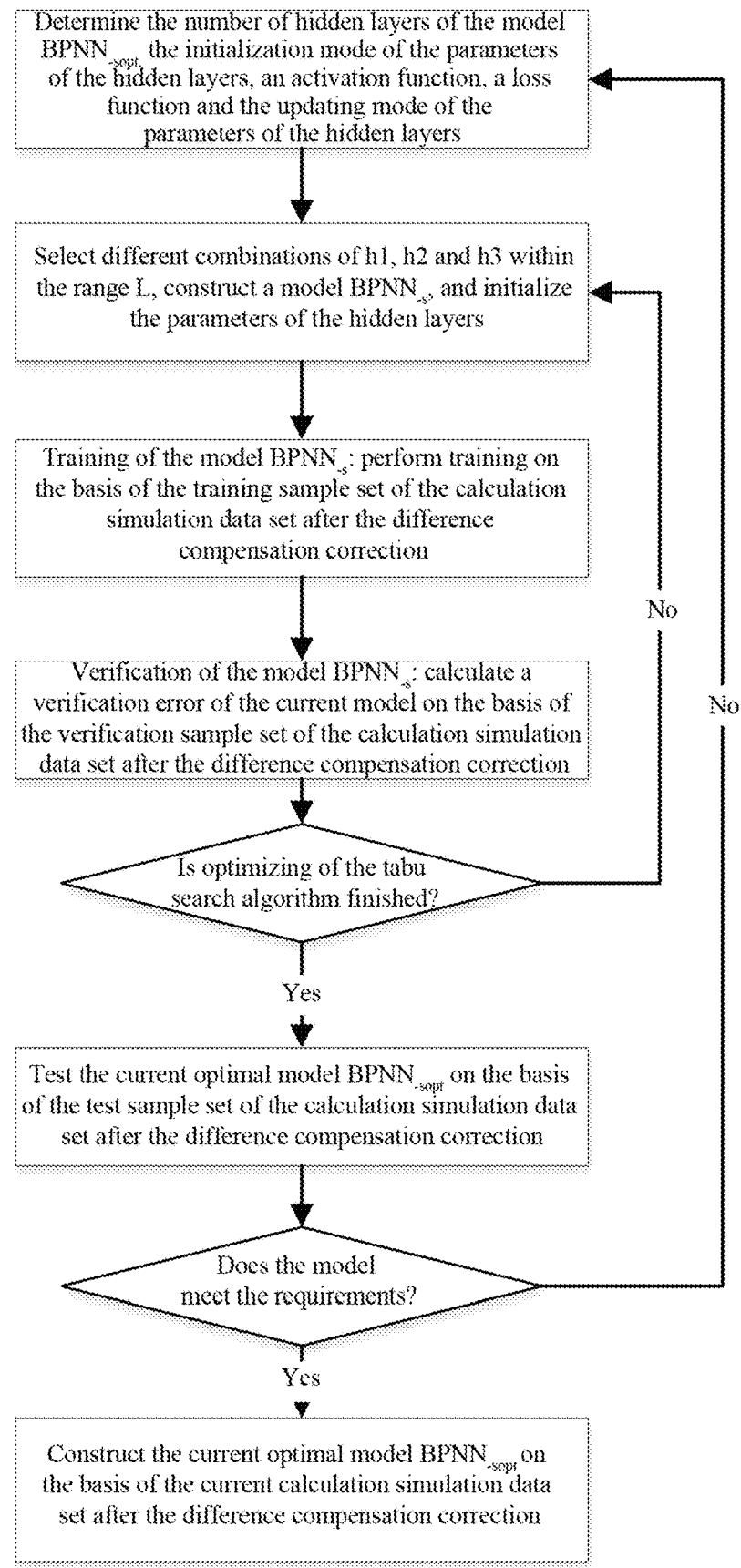
FIG. 3 is a flow diagram of constructing an optimal BP neural network model $BPNN_{sopt}$ on the basis of the calculation simulation data set after difference compensation correction according to an embodiment of the present application.

The above process is expressed by using the following pseudo-codes:

Input: the data set $ESet_s$, the data set $ESet_{htrain}$, the mark set of each data sample in the data set $ESet_s$, $\alpha$, $\beta$
Output: the calculation simulation data set $MSet_s$ after the difference compensation correction
for the data sample $Sample_p$ in the data sample set $ESet_s$:
  if the access attribute of the data sample $Sample_k$ == unvisited:
    if the mark set of the data sample $Sample_p$ is not empty $Sample_p$.flag ≠ { }:
      $sum_c = 0$; $sum_v = 0$;
      for the market set $Sample_p$.flag of the mark q in the data sample $Sample_p$:
obtain the data sample $Sample_q$ with a serial number q from the data sample set $ESet_{htrain}$;
        $\Delta y = |y_{real}^q - y_{FEA}^p|$;
        $S = r(Sample_p, Sample_q); r = ||Sample_p - Sample_q||_2^2$;
        $sum_c += e^{-\alpha S}$; $sum_v += e^{-\alpha S} \cdot \Delta y$;
      $\hat{y}_{FEA}^p = y_{FEA}^p + (sum_v + \beta)/sum_c$;

Step 4: selecting a BP neural network model as a prediction model of the peak-to-peak value of the horizontal vibration acceleration of the elevator car of the customized elevator product, and using the calculation simulation data set $MSet_s$ after the difference compensation correction as the training sample set, using the historical actual measurement verification set $ESet_{hvalid}$ as the verification sample set, using the historical actual measurement test set $ESet_{htest}$ as the test sample set, and training and constructing an optimal BP neural network model $BPNN_{sopt}$ combined with a tabu search algorithm. Further, the flow of constructing the optimal model $BPNN_{sopt}$ is shown in FIG. 3.

Step 4.1: construction and initialization of a model $BPNN_s$: the model is composed of an input layer, three hidden layers and an output layer, and the layers are fully connected. The number of neurons in the input layer is the number of input features of the data sample, that is 15, the number of neurons in the output layer is the number of output features of the data sample, that is 1, the number of neurons in the hidden layers is respectively $h_1$, $h_2$ and $h_3$, and the ranges of $h_1$, $h_2$ and $h_3$ are determined by means of $L=\sqrt{n_{in}+n_{out}}+a$, wherein L represents the number of neurons in the hidden layer, $n_{in}$ represents the number of neurons in the input layer, $n_{out}$ represents the number of neurons in the output layer, and a is a constant between (1,10). Further, the weights of the three hidden layers are all initialized as random numbers between [−1,1] that obey normal distribution, deviations are all initialized to 0, and the activation function adopts the form of relu-relu-relu-tanh.

Step 4.2: training and verification of the model $BPNN_s$: it is set that the mean square loss function is employed as the loss function during the training process, the weights and the deviations are updated by using a small batch gradient descent method, the learning rate is 0.002, the batch size is 30, the learning error target is $10^{-3}$, and the maximum number of learning cycles is 10,000. Iterative training is performed by using the training sample set $MSet_s$, and the training iteration as follows: 1) randomly sampling training samples of a batch size; 2) inputting the samples into the model in sequence, and performing forward calculation to calculate the corresponding output; 3) calculating the loss $l_{batch}$ of the training samples of the batch size according to the loss function; 4) performing error back propagation, and updating the weights and the deviations by using the small batch gradient descent method; 5) repeating 1-4 times until the training samples in the entire training sample set $MSet_s$ are traversed, and accumulating the loss of various batches to obtain the loss $l_{sum}$ of the entire training sample set $MSet_s$;

6) judging whether the loss $l_{sum}$ in the step 5 meets the set learning error target, if so, completing the model training, otherwise, entering the next step; 7) judging whether the number of iterations exceeds the set maximum number of learning cycles, if so, completing the model training, otherwise, completing one cycle iteration, entering the next cycle, and skipping to the step 1.

The trained model is verified by using the verification sample set $ESet_{hvalid}$. The verification samples are input into the model in sequence, the corresponding output is calculated through forward calculation, then a sample error is calculated according to the loss function, and finally the errors of various verification samples are accumulated to obtain a corresponding verification error.

Step 4.3: optimizing the parameters $h_1$, $h_2$ and $h_3$ of the model in combination with the tabu search algorithm: selecting different combinations of $h_1$, $h_2$ and $h_3$ within the range determined by L, constructing and initializing the model $BPNN_s$ according to the step 4.1, and then training and verifying the model according to the step 4.2 to obtain verification errors under the different combinations of $h_1$, $h_2$ and $h_3$. With the verification error as the target, $h_1$, $h_2$ and $h_3$ are optimized by using the tabu search algorithm, and the optimal numbers $h_{1opt}$, $h_{2opt}$ and $h_{3opt}$ of neurons in the hidden layers are determined, therefore training is performed on the basis of the current fixed number of hidden layers and the calculation simulation data set $MSet_s$ after the difference compensation correction, so as to obtain an optimal model $BPNN_{sopt}$.

Step 4.4: testing of the current optimal model $BPNN_{sopt}$: testing the current optimal model $BPNN_{sopt}$ by using the test sample set $ESet_{htest}$, calculating a calculation error, if the calculation error meets the requirements, setting the model as the final product performance prediction model, or otherwise, resetting the number of hidden layers of the BP neural network model, and repeating the steps 4.1 to 4.3 in the step 4, so as to construct, train and verify the model.

The test error of the prediction model $BPNN_{sopt}$ is calculated by using a mean square absolute percentage error as an indicator, and the expression of the mean square absolute percentage error is shown as follows:

$$MAPE = \frac{1}{N_{valid}} \sum_{u=1}^{N_{valid}} \frac{|y^u_{pre} - y^u_{obj}|}{y^u_{obj}} \times 100\% \quad (4)$$

In the formula, $N_{valid}$ represents the sample size of the historical actual measurement verification set; $y_{pre}^u$ represents a predictive value of the prediction model $Surr_{bpmix}$ for the peak-to-peak value of the horizontal vibration acceleration of the elevator car of the $u^{th}$ data sample in the historical actual measurement verification set; and $y_{obj}^u$ represents an actual measurement value of the peak-to-peak value of the horizontal vibration acceleration of the elevator car of the $u^{th}$ data sample in the historical actual measurement verification set.

The test errors of the constructed prediction model $BPNN_{sopt}$ on the samples in the test sample set $ESet_{htest}$ are shown in Table 3.

TABLE 3

Test error of the prediction model $BPNN_{sopt}$ on the test sample set $ESet_{htest}$

| Input/output | | | Serial number | | | |
|---|---|---|---|---|---|---|
| | | | 1 | 2 | 3 | 4 |
| Input feature | $v_{max}$[m/s] | | 9.32 | 9.1 | 6.11 | 9.87 |
| | $a_{max}$[m²/s] | | 1.06 | 1.00 | 0.82 | 0.84 |
| | H[m] | | 108.6 | 322.1 | 309.2 | 148.2 |
| | ρ[kg/m] | | 0.68 | 0.58 | 0.51 | 0.55 |
| | E[N/m²] | | 8.6e10 | 11.3e10 | 11.3e10 | 10.5e10 |
| | D[mm] | | 12.2 | 14.0 | 12.6 | 17.9 |
| | $m_{car}$[kg] | | 1147 | 1128 | 1226 | 1065 |
| | $J_{car}$[kg·m²] | | 7626 | 5458 | 7534 | 4577 |
| | $m_{frame}$[kg] | | 1133 | 965 | 1146 | 942 |
| | $J_{frame}$[kg·m²] | | 5823 | 3723 | 3917 | 5685 |
| | $m_{load}$[kg] | | 1948 | 1171 | 1481 | 1789 |
| | $k_{shoe}$[N/m] | | 1.7e5 | 3.9e5 | 8.2e5 | 7.5e5 |
| | $c_{shoe}$[N·s/m] | | 1565 | 661 | 1245 | 2225 |
| | $k_{rub}$[N/m] | | 8.5e5 | 5.2e5 | 3.1e5 | 8.5e5 |
| | $c_{rub}$[N·s/m] | | 2191 | 2309 | 2377 | 1520 |
| Output feature | $a_{hvpp}$[m²/s] | Actual measurement value | 0.9384 | 0.9154 | 0.5176 | 0.9446 |
| | | Predictive value | 0.9673 | 0.9425 | 0.4929 | 0.9412 |
| Mean square absolute percentage error (MAPE) | | | 2.79% | | | |

It can be seen from Table 3 that, for the samples in the test sample set $ESet_{htest}$, the mean square absolute percentage error of the constructed prediction model $BPNN_{sopt}$ for the peak-to-peak value of the horizontal vibration acceleration of the elevator car is 2.79%. The smaller the mean square absolute percentage error is, the higher the prediction accuracy of the model is, and the better the prediction performance is. Further, when the mean square absolute percentage error is less than 10%, the prediction accuracy of the model meets the requirements. Therefore, the constructed prediction model $BPNN_{sopt}$ can realize the credible prediction on the peak-to-peak value of the horizontal vibration acceleration of the elevator car.

Step 5: prediction of a to-be-tested data sample: for a data sample to be predicted, firstly performing normalization according to the data normalization processing mode of the calculation simulation data set in the step 2, and then inputting the data sample into the depth auto-encoder constructed in the step 3 for encoding, and finally inputting the encoded sample to be predicted into the prediction model $BPNN_{sopt}$ for prediction, and obtaining the peak-to-peak values of the horizontal vibration acceleration of the elevator car of the customized elevator product under different configuration parameter conditions.

What is claimed is:

1. A customized product performance prediction method based on heterogeneous data difference compensation fusion, comprising the following steps:

(1) collecting and obtaining data samples with a configuration parameter of a customized product as an input feature and performance of the customized product to be predicted as an output feature; collecting actual measurement performance data of an existing product, and constructing a historical actual measurement data set for performance prediction of the customized product; establishing a virtual simulation model of the customized product by using computer simulation software, obtaining performance data through simulation analysis, and constructing a calculation simulation data set for performance prediction of the customized product;

(2) performing data preprocessing on the historical actual measurement data set and the calculation simulation data set;

(3) performing difference compensation correction on the calculation simulation data set on the basis of the historical actual measurement data set: encoding the historical actual measurement data set and the calculation simulation data set on the basis of a depth auto-encoder, mapping the data samples from an input space into a feature space, so as to express key features of the data samples, denoting the encoded historical actual measurement data set as $ESet_h$, and denoting the encoded calculation simulation data set as $ESet_s$; dividing, through random sampling, the data set $ESet_h$ into a training sample set, a verification sample set and a test sample set, which are denoted as a historical actual measurement training set $ESet_{htrain}$, a historical actual measurement verification set $ESet_{hvalid}$, and a historical actual measurement test set $ESet_{htest}$, respectively; and finally performing associated connection on the data set $ESet_s$ and the data set $ESet_{htrain}$ by using a neighborhood association method, performing difference compensation correction on the data set $ESet_s$ by using the data set $ESet_{htrain}$ by means of a similarity difference compensation method, and denoting the data set $ESet_s$ after the difference compensation correction as $MSet_s$;

(4) selecting a BP neural network model as a performance prediction model of the customized product, and taking the input feature and the output feature selected in the step (1) as the input and output of the prediction model; using the calculation simulation data set after the difference compensation correction as the training sample set, and training and constructing an optimal BP neural network model combined with a tabu search algorithm; and then testing the model by using the historical actual measurement test set $ESet_{htest}$, so as to obtain a final performance prediction model of the customized product; and (5) for a data sample to be predicted, firstly performing data preprocessing according to the processing of the calculation simulation data set in the step (2), and then inputting the data sample into the depth auto-encoder constructed in the step (3) for encoding, and finally inputting the encoded sample to be predicted into the prediction model constructed in the step (4) for prediction and obtaining the product performance of the customized product under different configuration parameter conditions;

in the step (3), a neural network model is trained by using the historical actual measurement data set and the calculation simulation data set to serve as the depth auto-encoder for the data samples; the depth auto-encoder is composed of an input layer, an encoder, a feature expression layer, a decoder and an output layer, and both the encoder and the decoder comprise three hidden layers; the input and output of the depth auto-encoder are input feature vectors of the data samples, the layers are fully connected, an activation function between the input layer and the hidden layer, and an activation function between the hidden layer and the hidden layer are relu function, and an activation function between the hidden layer and the output layer is tanh function;

in the step (3),associated connection on the encoded calculation simulation data set $ESet_s$ and the encoded historical actual measurement training set $ESet_{htrain}$ is performed by using the neighborhood association method, the specific association process is: initializing an empty mark set for each data sample in the data set $ESet_s$; randomly selecting a data sample $Sample_k$ in the data set $ESet_{htrain}$, taking the data sample $Sample_k$ as the center, taking a neighborhood threshold $\varepsilon$ as the radius, adding tags of data samples in the data set $ESet_s$ within this neighborhood range into the mark set, wherein the added mark is the serial number of the data sample $Sample_k$, and at the same time, setting the access attribute of the data sample $Sample_k$ as visited; traversing all data samples whose access attributes are unvisited in the data set $ESet_{htrain}$, and repeatedly adding marks for the data samples within the neighborhood range until the access attributes of all the data samples in the data set $ESet_{htrain}$ are visited; and in the step (3), difference compensation correction on the encoded calculation simulation data set $ESet_s$ is performed by using the historical actual measurement training set $ESet_{htrain}$ on the basis of the similarity difference compensation method, the similarity difference compensation method is: traversing the data set $ESet_s$, and performing difference compensation correction on the output feature of the data sample for each data sample $Sample_l$ whose mark tag is not empty according to the following formula:

$$\hat{y}_{FEA}^l = y_{FEA}^l + \frac{\sum_{z=1}^M e^{-\alpha S_z} \cdot \Delta y_z + \beta}{\sum_{z=1}^M e^{-\alpha S_z}}$$

$$\Delta y_z = |y_{real}^z - y_{FEA}^l|$$

where, $\hat{y}_{FEA}^l$ represents an output feature vector of the data sample $Sample_l$ after the difference compensation correction; $y_{FEA}^l$ represents the output feature vector of the data sample $Sample_l$ before the difference compensation correction, that is, the output feature vector obtained through simulation analysis; M represents the number of marks in the mark set of the data sample $Sample_l$, that is, the number of data samples in the data set $ESet_{htrain}$ associated with the data sample $Sample_l$; $S_z$ represents the Euclidean distance between the data sample $Sample_l$ and the data sample in the $z^{th}$ data set $ESet_{htrain}$ associated with the data sample $Sample_l$, which measures the similarity between the two data samples; $\Delta y_z$ represents an absolute difference between the output feature vector of the data sample $Sample_l$ and the output feature vector of the data sample in the $z^{th}$ data set $ESet_{htrain}$ associated with the data sample $Sample_l$; $y_{real}^z$ represents the output feature vector of the data sample in the $z^{th}$ data set $ESet_{htrain}$ associated with the data sample $Sample_l$; and $\alpha$ and $\beta$ are hyperparameters.

2. The customized product performance prediction method based on heterogeneous data difference compensation fusion according to claim 1, wherein the step (2) comprises: firstly performing data denoising and data supplement processing on the historical actual measurement data set; and then performing data normalization processing on the historical actual measurement data set and the calculation simulation data set, respectively.

3. The customized product performance prediction method based on heterogeneous data difference compensation fusion according to claim 1, wherein in the step (4), the calculation simulation data set $ESet_s$ after the difference compensation correction is taken as the training sample set, the historical actual measurement verification set $ESet_{hvalid}$ is taken as the verification sample set, the historical actual measurement test set $ESet_{htest}$ is taken as the test sample set, and an optimal BP neural network model $BPNN_{sopt}$ is trained and constructed in combination with the tabu search algorithm to serve as a final prediction model; the model is composed of an input layer, three hidden layers and an output layer, the layers are fully connected, the number of neurons in the input layer is the number of input features of the data sample, the number of neurons in the output layer is the number of output features of the data sample, the number of neurons in the hidden layers is $h_1$, $h_2$ and $h_3$, respectively, and the ranges of $h_1$, $h_2$ and $h_3$ are determined by means of $L=\sqrt{n_{in}+n_{out}}+a$, where $L$ represents the number of neurons in the hidden layer, $n_{in}$ represents the number of neurons in the input layer, $n_{out}$ represents the number of neurons in the output layer, and a is a constant between (1,10); different $h_1$, $h_2$ and $h_3$ are selected in the corresponding ranges, the model under the current combination of $h_1$, $h_2$ and $h_3$ is trained by using the training sample set, and the model obtained by training is verified by using the verification sample set, so as to obtain a verification error under the current combination of $h_1$, $h_2$ and $h_3$; with the verification error as the target, $h_1$, $h_2$ and $h_3$ are optimized by using the tabu search algorithm, and the optimal numbers $h_{1opt}$, $h_{2opt}$ and $h_{3opt}$ of neurons in the hidden layers are determined, so that training is performed on the basis of the current fixed number of hidden layers, so as to obtain an optimal model $BPNN_{sopt}$; and finally, the optimal model $BPNN_{sopt}$ is tested by using the test sample set, if requirements are met, the model is selected as the final prediction model, or if requirements are not met, the number of hidden layers of the BP neural network model is reset, and a new network model is retrained.

4. The customized product performance prediction method based on heterogeneous data difference compensation fusion according to claim 3, wherein in the step (4), the initialization of the hidden layer adopts the following method: weights are all initialized as random numbers between [−1,1] that obey normal distribution, and deviations are all initialized to 0; the activation function adopts the form of relu-relu-relu-tanh, the loss function adopts a mean square loss function, and the weights and the deviations are updated by using a small batch gradient descent method.

* * * * *